United States Patent

Allison

[15] 3,643,140
[45] Feb. 15, 1972

[54] DC ENERGIZED TIMING MOTOR UTILIZING A RESONANT MEMBER TO MAINTAIN CONSTANT SPEED

[72] Inventor: William W. Allison, Melville, N.Y.
[73] Assignee: Armec Corporation, Huntington Station, N.Y.
[22] Filed: Aug. 7, 1970
[21] Appl. No.: 62,125

Related U.S. Application Data

[63] Continuation-in-part of Ser. No. 763,803, Sept. 30, 1968, abandoned.

[52] U.S. Cl...................................318/138, 318/132, 318/254
[51] Int. Cl..................................H02k 29/02, H02k 33/00
[58] Field of Search................331/116 M; 318/47, 129, 132, 318/254, 329, 328, 449, 451, 138

[56] References Cited

UNITED STATES PATENTS

| | | | |
|---|---|---|---|
| 3,161,813 | 12/1964 | De Wolf et al. | 318/129 X |
| 3,500,103 | 3/1970 | Swain et al. | 318/254 |
| 3,150,337 | 9/1964 | Allison | 331/116 M |
| 2,890,440 | 6/1959 | Cluwen | 318/254 |
| 2,753,471 | 7/1956 | Henninger et al. | 318/254 X |

Primary Examiner—J. D. Miller
Assistant Examiner—Robert J. Hickey
Attorney—James A. Eisenman and Robert R. Strack

[57] ABSTRACT

A DC energized timing device including an electromagnetically driven rotor, a stator and a frequency reference in the form of a resonant member, with a pickup system providing signals which are a function of resonator action or resonator action and rotor motion, the signals being selectively utilized as part of a control circuit for the energization of the motor winding. The rotor and resonator include complementary coupling means which react under rotor motion to excite the resonator into its resonant mode at synchronous speed.

21 Claims, 11 Drawing Figures

PATENTED FEB 15 1972
3,643,140
SHEET 1 OF 2
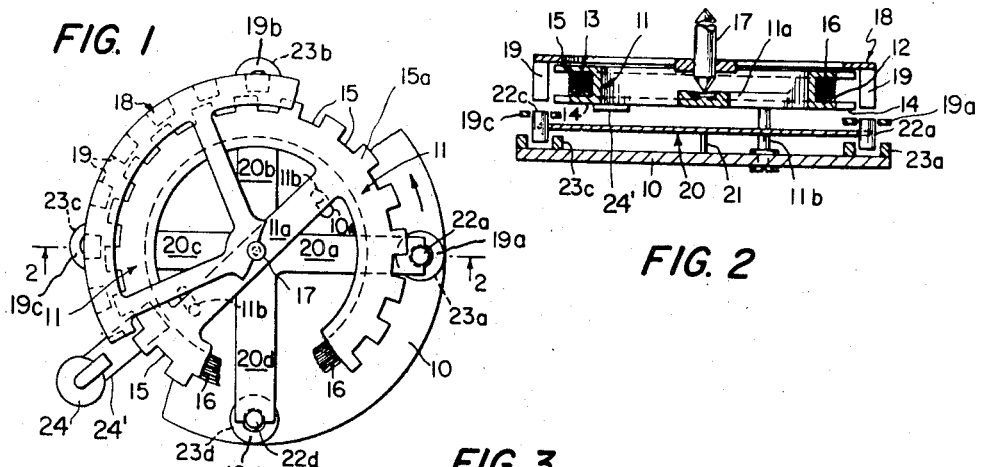
FIG. 1
FIG. 2
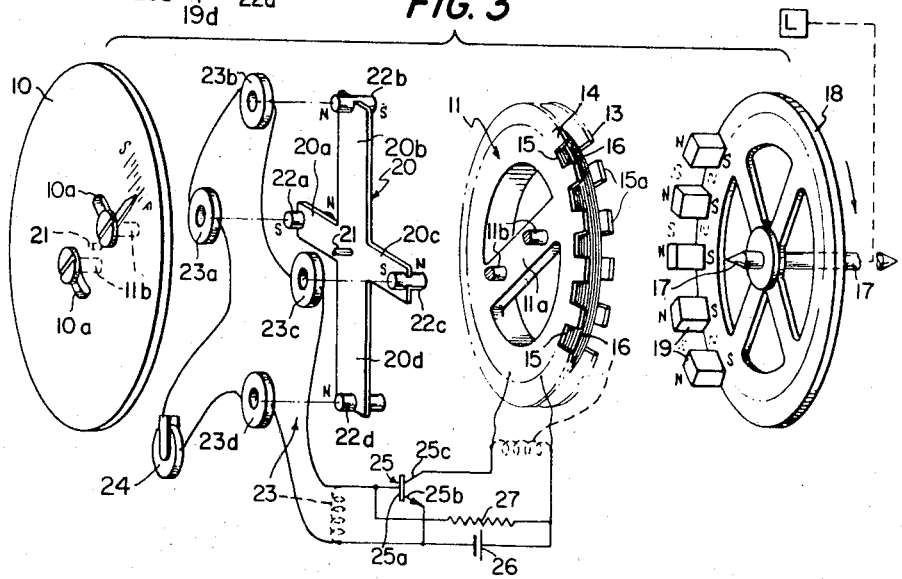
FIG. 3
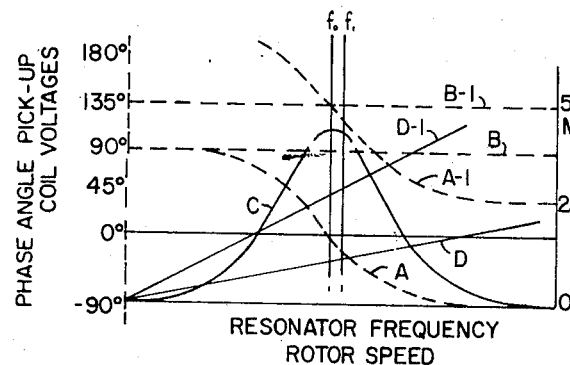
FIG. 4A
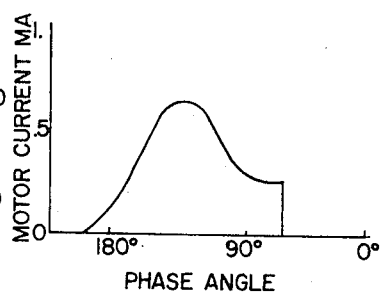
FIG. 4B
INVENTOR.
WILLIAM W. ALLISON
BY Eisenman + Strach
ATTORNEYS.

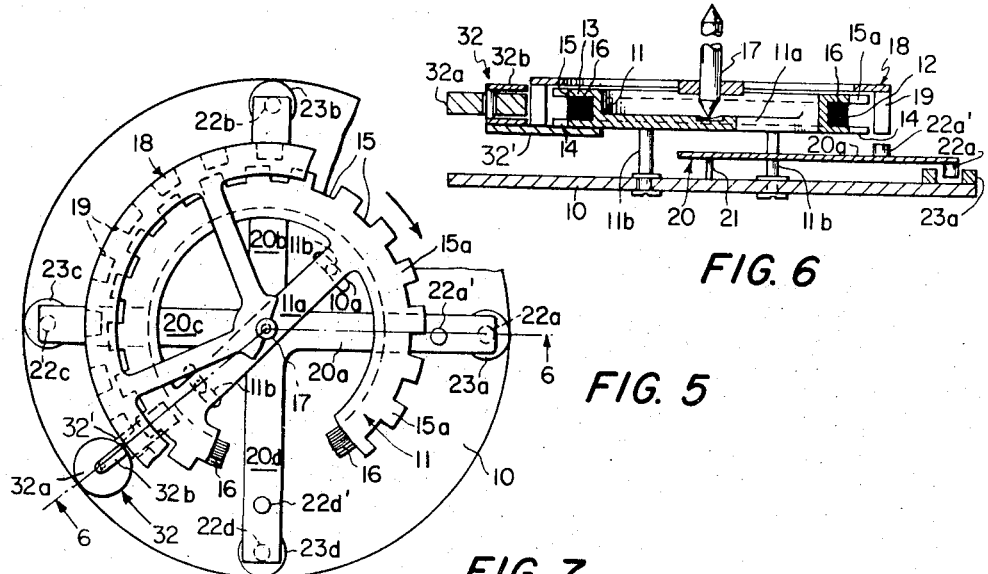
FIG. 6
FIG. 5
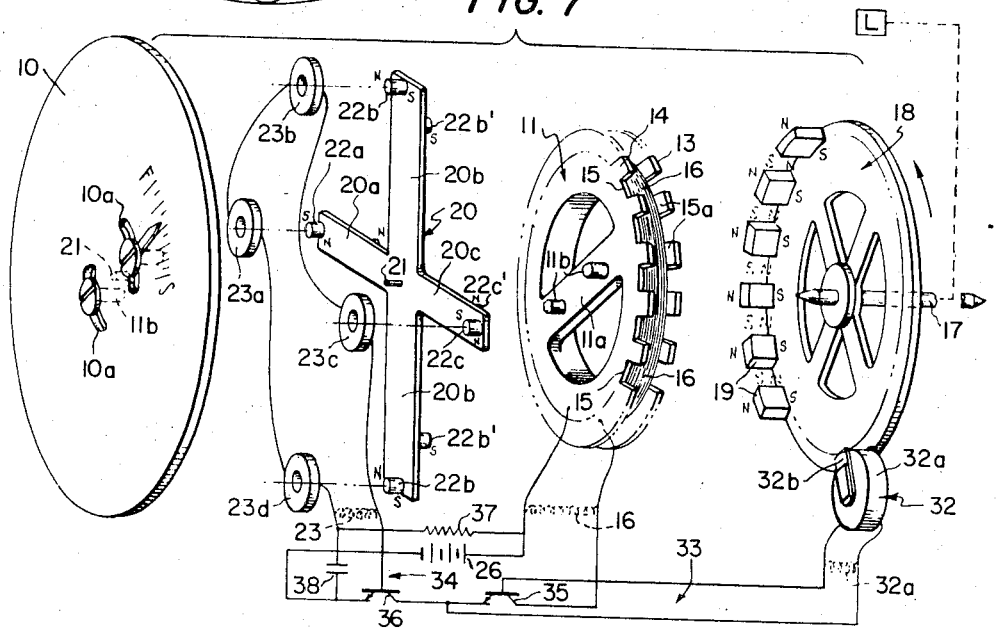
FIG. 7
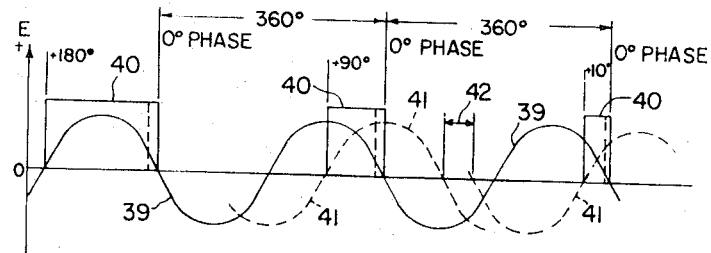
FIG. 8A   FIG. 8B   FIG. 8C
INVENTOR.
WILLIAM W. ALLISON
BY Eisenman & Stroch
ATTORNEYS.

3,643,140

DC ENERGIZED TIMING MOTOR UTILIZING A RESONANT MEMBER TO MAINTAIN CONSTANT SPEED

CROSS REFERENCE TO OTHER APPLICATIONS

This application is a continuation-in-part of application Ser. No. 763,803, filed Sept. 30, 1968, now abandoned.

BACKGROUND OF THE INVENTION

The invention relates to timing devices and, in particular, to DC energized timers incorporating their own frequency references and which are relatively insensitive to environmental stresses but which nevertheless operate at high efficiency on low power.

DC energized timing devices are characteristically either sensitive to environmental stresses, such as shock, vibration and temperature, or else they consume large amounts of power, or both. In addition, they tend to be complicated in their construction, particularly in small sizes. One present timing motor design, for example, utilizes an electromagnetically driven tuning fork in which the vibrating motion of a tine of the fork is harnessed to a ratchet wheel, through either mechanical or magnetic coupling, to drive an output shaft which turns such loads as watch hands. Another presently used DC energized timer utilizes a frequency reference, such as a tuning fork or other resonator, to produce a low level AC signal which is amplified and fed into a synchronous motor which drives the load. Brushless DC motors have also been used as timing motors together with complex controls, both mechanical and electrical, to regulate torque and speed. These various devices tend to be expensive, fragile, large in size or consume large amounts of power. Other DC timing devices utilize vibrating reeds, crystal and circuit oscillators or mechanical governors, all of which are highly sensitive to one or more of the environmental stresses of shock, vibration and temperature. Still another well-known device utilizes a resonant member, usually a mass-loaded tuning fork, coupled magnetically to the rotor shaft of a DC motor to be excited into resonance as the rotor speed matches the natural resonant frequency. The vibrating resonator is able to exert certain speed-controlling forces by causing increased drag when the motor tries to decrease its speed. In such a device the regulating forces and useful output torque are extremely small so that synchronism is difficult to achieve and to maintain, and there is no basic control of input power. More sophisticated attempts have been made to use rotor-coupled resonators to control motor speed by utilizing the electrical output signal from the resonator. Problems of stability, particularly under load conditions, and power consumption are characteristic of these devices.

SUMMARY OF THE INVENTION

In accordance with the invention, there is provided an electromagnetically driven rotor and an associated pickup system, having an electrical output which alternates or pulses at a frequency which is equal to a constant times the rotational speed of the rotor. An accurate frequency reference in the form of a resonator is also provided with a pickup system which responds to its resonant motion. The rotor and resonator signals are selectively utilizable to control the pulse frequency to the winding of the motor. To this end, the resonator is coupled directly magnetically to the rotor so that the resonator is excited as a function of the rotor speed. As the rotor speed continues to increase due to utilization of its own control signals to furnish drive pulses of increasing frequency, it reaches a speed of rotation at which the resonator is driven in its resonant frequency, at which time the rotor speed becomes locked in synchronism with the resonator due to the selective and cooperative utilization of the control signals. In the event external forces or power changes cause the rotor to reduce its speed, the system will recapture the rotor, either by switching back to rotor control in case of severe speed reduction or, for less severe cases, by utilizing certain electrical characteristics including resonator phase-advance coupled with controlled torque pulse duration and timing. If the speed is increased, the persistence of the resonator and the resonator phase shift with increasing speed will enable the resonator to recapture the rotor within reasonable limits.

If desired, the rotor pickup portion of the system can be eliminated by using manual or mechanical starting, although at some loss of ability to recover from severe losses in rotor speed.

It is an object of the present invention to provide a DC energized timer which is relatively insensitive to environmental disturbances, and consumes relatively small amounts of power.

Another object of the invention is to provide a DC energized timer in which the frequency source is integrated with the propulsion source in a manner which increases efficiency and reduces size.

Another object of the invention is to provide a DC energized timer which is self-starting and relatively insensitive to variations in DC voltage.

Still another object of the invention is to provide a DC energized timer in which the conventional expedient of overpowering at all times is not required to accommodate random extraordinary disturbances to maintain synchronous speed. Thus, excess power demands are imposed on the source only when required to overcome the effects of such disturbances.

Still another object of the invention is to provide a DC energized timer capable of being fabricated in miniature sizes for use as a wristwatch.

The above and other features and objects of the present invention will be more fully understood from the following specification taken in conjunction with the accompanying drawings:

BRIEF DESCRIPTION OF THE DRAWINGS

FIG. 1 is a plan view of a DC energized timing device in which the rotor portion is partly broken away to reveal the stator and the frequency reference source;

FIG. 2 is a view in vertical section taken on the line 2—2 of FIG. 1 looking in the direction of the arrows;

FIG. 3 is a diagrammatic view, exploded and in perspective, of the timing device of FIGS. 1 and 2 and includes a circuit diagram illustrating the electronic circuit utilized in the system;

FIG. 4A is a graph plotting timing and phase functions and pickup voltage against rotor speed or frequency of the resonant member;

FIG. 4B is a graph showing the torque pulse characteristics in relation to geometric phase angle of the rotor;

FIGS. 5–7 are views corresponding to FIGS. 1–3 showing a modification of the invention which is particularly useful in cases in which minimum power consumption is critical; and FIGS. 8A, 8B and 8C are wave form diagrams showing the interaction of control signals and drive pulses in the operation of the circuit shown in FIG. 7.

DESCRIPTION OF ONE PREFERRED EMBODIMENT

Referring to the drawing, the invention is illustrated as embodied in a timing motor including a base 10 supporting a stator 11 carried by its web 11a by means of posts 11b received in arcuate slots 10a in the base for angular adjusting movement. The stator includes a ferromagnetic, outwardly opening annular channel 12, with the upper and lower portions 13 and 14 of the channel being formed with a circumferential array of indentations or serrations 15 dividing the stator into a plurality of poles, each U-shaped in cross section. Received in the channel 12 common to all poles is a drive coil 16.

Mounted in bearings 17 is a rotor 18 disposed coaxially with respect to the stator 11 and carrying in a circumferential array around its periphery a series of magnetic members 19 complementary to the magnetic members or poles of the stator. The magnetic members can be active as shown or passive as shown in applicant's copending application Ser. No. 870,577, filed Oct. 29, 1969. As best seen in FIG. 2, the magnetic members 19 extend downwardly to the U-shaped pole faces, spanning the distance between the upper and lower portions of each pole to complete a flux loop with each through a pair of air gaps.

Mounted beneath the stator 11 and rotor 18 is a resonator which preferably takes the form of a cruciform plate resonator 20, such as described in U.S. Pat. No. 3,150,337. The resonator 20 is carried by a central, nodal-point mounting pin 21 secured to the base 10 and disposed coaxially with respect to the central axes of the rotor 18 and stator 11. If desired, a soft mount can be used in place of the hard mount shown. As described in that patent, the four resonator arms 20a, 20b, 20c and 20d resonate up and down in a pattern in which one pair of aligned arms, say 20a and 20c, flex downward while the corresponding pair of aligned arms 20b and 20d flex upward, and vice versa. The resonator will operate at a precise, predetermined frequency much the same, for example, as a tuning fork, but is free of attitude errors and is relatively more stable under environmental influences such as vibration and shock.

Carried at the free end of the respective resonator arms 20a, b, c and d are permanent magnets 22a, b, c and d in close proximity to the magnetic members 19 carried by the rotor 18. In the illustrated embodiment, the magnetic members 19 around the periphery of the rotor 11 are all polarized in the same direction and the magnets 22a, b, c and d on the resonator arms are polarized alternately north and south. In this fashion, one pair of aligned resonator arms will be pulled toward the rotor and the other aligned pair will be repelled, each time the rotor magnets are aligned with the resonator magnets, while the forces will be reversed each time the rotor magnets straddle the resonator magnets, this due to the return flux field between each pair of north poles, which establishes effective south poles. Thus, the resonator is driven or excited in a mode corresponding to its natural mode, and when the speed of the rotor reaches the appropriate values, the resonator will begin to resonate with an attendant and unique interaction of forces and currents described more fully below.

Associated with the magnets 22a, b, c and d are pickups in the form of coils 23a, b, c and d connected in series, with the sense of the winding of all coils being the same to accommodate the different directions of resonator arm motion and the reversed polarity of the magnets on alternate arms. The motion of all of the arms generates a common pickup signal reflecting the resonant motion. It should be understood that it is not required that there be magnets 22 and coils 23 for all four of the resonator arms. The resonator can be driven from one, two, or three arms as well, and pickup coils can be used on one, two, or three arms, not all of which need be driven arms. Thus, the resonator and its associated drive and pickup form an oscillator for furnishing control signals to the timing motor.

A pickup 24 is disposed in proximity to the rotor magnetic members 19 so that a control signal is generated as each magnetic member 19 passes when the rotor is in motion. The rotor pickup coil 24 is preferably carried by means of a support 24a by the stator 11 and, as illustrated in the drawing in FIG. 1, it is in a specific location with respect to the stator poles as will be described more fully below. In order that the magnetic members 19 of the rotor be shielded from the pickup coils 23a, b, c and d for the resonator, shields 19a, b, c and d are provided on each resonator arm. Action of the magnetic members 19 on the magnets 22a, b, c and d is not, however, shielded so that when the rotor 18 rotates, its magnetic members 19 will pass the magnets 22 on the resonator, urging the resonator arms up and down as a function of the rotor speed, and when the rotor speed reaches a certain critical speed at which the resonator arms are excited at natural resonant frequency, the resonator will vibrate in its resonant mode with only very small amounts of energy taken from the rotor.

Referring to FIG. 3, the control signals in the pickups 23a–d and 24 in series are fed into a control circuit with one terminal of the pickups being connected to the base electrode 25a of a transistor 25. The emitter electrode 25b of the transistor 25 is connected to the negative terminal of a DC source such as a battery 26, the positive terminal of which is connected to one terminal of the stator winding 16. The other terminal of the rotor winding 26 is connected to the collector electrode 25c of the transistor. A biasing resistor 27, which can be adjustable for certain purposes, is connected between the positive terminal of the battery and the base electrode 25c of the transistor. The other terminal of the series-connected pickups 23 and 24 is connected to the negative terminal of the battery 26. The control circuit is preferably arranged with a sufficient gain so that when the circuit is energized by the battery, oscillations of the rotor will begin to build up, after which rotation begins. Thus, the loop gain of the system (including the circuit, the rotor and the stator) is greater than unity at rotor speed less than synchronism until it is modified by resonator action near synchronous speed where it becomes equal to unity. By loop gain is meant the ratio of average motor torque to windage, friction and load torques.

As the motor speed increases, the frequency of the signal in the pickup 24 will increase and the rate of excitation of the resonator arms 20 will also increase until the system approaches the resonant frequency of the resonator. As the two frequencies approach coincidence, the power from the control circuit to the motor will then be modified so that the speed of the rotor will no longer increase and the rotor will be locked in synchronism with the constant frequency of the resonator.

In the nomenclature used to describe the invention, geometrical phase angle is the measure of angular displacements from the center of a stator pole (geometrical phase angle zero) taken as positively increasing in a direction opposite to the rotation of the rotor, where 360° is considered to be the angle between centers of successive like stator poles. Electrical or magnetic phase angle corresponds to the geometrical phase angle at which the maximum positive point of cyclically varying electrical or magnetic quantities (voltage, current or flux) occurs. The positive direction of flux in the stator magnetic circuits is the direction of flux existing in the circuit due to permanent or residual magnetization of the rotor or stator when the rotor is at 0° geometrical phase angle and no current is flowing in the stator coil. The positive direction of current in the stator coil is that direction of current which increases the magnitude of the flux when the rotor is aligned with 0° geometrical phase angle. The positive direction or polarity of voltage supplied to the stator coil is the direction or polarity which produces a positive current. The positive direction or polarity of rotor and resonator pickup coils is the direction or polarity which produces a positive voltage applied to the stator coils.

The pertinent phase angles and magnitudes of the control voltages are shown in FIG. 4A. The four illustrated curves are all plotted against rotor speed and resonator frequency on the X-axis and electrical phase angle on the Y-axis (in two scales). An additional Y-axis scale, on the right, indicates pickup voltage (r.m.s.) in millivolts. The plots are diagrammatic to illustrate the principles and are not precisely proportioned.

Curve A is a plot of the electrical phase angle of the voltage outputs of pickups 23a–d due to resonant motion of the resonator when the resonator is set at 0° geometrical phase angle. Curve A–1 is a plot of the same quantity when the resonator is set at 135°.

Curve B is a plot of the electrical phase angle of the voltage of the rotor pickup 24 when the rotor pickup is set at 0° geometrical phase angle and curve B–1 is the same quantity when the rotor pickup is set at 45°.

Curve C is the r.m.s. voltage in the pickup 23, measured in millivolts, due to resonator action.

Curve D is the r.m.s. voltage in the pickup 24 due to rotor motion for the motor of FIGS. 1–3, and D–1 is the corresponding curve for the modification of FIGS. 5–7.

Assuming for purposes of explanation that the motor is to be operated in a magnetic attraction mode with the rotor turning in the direction of the arrow and that the pickup 24 is disposed exactly opposite stator poles 15a (unlike FIG. 1), the system is arranged so that before the resonator becomes excited, drive current first begins to flow in the drive coil 16 at approximately +180° geometrical phase angle, i.e., the rotor magnets will be approximately halfway between stator poles at the leading edge of the drive pulse. As the rate of the magnets of the rotor passing the resonator magnets approaches resonant frequency, the resonator will begin to vibrate with increasing amplitude.

The position of the resonator is such that the voltage in the pickup system due to resonator motion will be substantially 90° lagging with respect to the voltage in the pickup system due to rotor motion. The drive pulse fed to the motor will, therefore, be shifted so that a portion accelerates the rotor and another portion decelerates the rotor.

Assuming there is no phase advance adjustment of the pickups 23 or 24, until the resonator is excited the full drive pulse of about 180° duration will occur beginning at +180° geometrical phase angle and will operate to attract (and hence accelerate) the rotor for 180° (from +180° to 0°). When the resonator becomes excited, its pickup voltage will predominate and when the rotor and resonator signals sum to a positive value, will initiate drive current slightly more than 90° ahead of the geometrical zero. At exactly resonant speed the instantaneous maximum voltage due to the resonator occurs when the rotor magnets are aligned with the resonator magnets. When the sum of the resonator-generated and rotor-generated signals returns to zero, the drive pulse will terminate. This will occur at slightly before minus 90° geometrical phase. Slightly less than one-half of the drive current now occurs to retard or decelerate the rotor, and it achieves synchronism by increasing or decreasing the differential to supply the necessary torque in the manner of a conventional synchronous motor. If under standard voltage and load conditions this differential is less or more than is necessary to drive the motor at exactly synchronous speed, the pickup 23 is advanced or retarded to supply the required differential. The differential is changed by the electrical phase shift of resonator pickup signal which occurs when the resonator is driven slightly above or below resonance.

Since the output of the resonator near resonance or synchronism should be larger by a factor of, say, 10 than the voltage output due to the rotor motion, the resonator phase angle needs only to be very slightly lagging to reduce the accelerating torque to zero. This slightly lagging phase angle in a high Q resonator results in extremely small deviations of resonator operating frequency from exact resonance. A further increase in speed of the rotor due, for example, to external disturbances such as shock, will further reduce the torque by moving the resonator signal more negative in phase angle. This, together with persistence of the resonator and increasing load factors on the motor with increased speed, will normally be sufficient to recapture the rotor into synchronism. It will be understood, therefore, that the system will operate at all times to drive the rotor at synchronous speed, pulling it up when it is forced below resonant speed and pulling it down when it is accelerated above resonant speed. Thus, unlike conventional synchronous AC motor practice, it is not necessary to provide continual excess or over power in the drive coil 16 of the motor in order to resist loss of synchronism which in typical systems cannot readily be recaptured for all directions of departure from synchronism.

With the system as described above in operation, there may occur long-term changes in load or supply voltage which will affect precise timekeeping. To adjust for timekeeping, an adjustment is provided in which the geometric phase angle of the resonator and its pickup to the stator poles is changed so that the time-phase angle of operation of the resonator changes to increase or decrease the operating point on the resonance curve (curves A, B, and C and frequencies $f_0$ and $f_1$ of FIG. 4A). This adjustment can be effected by turning the stator 11 in the slots 10a in the base 10.

The motor can also be operated in a magnetic repelling mode, in which case the turn-on time of the drive pulse in the stator coil 16 occurs at zero geometric phase angle position. In either mode, repelling or attracting, the motor is basically capable of running in either direction and to insure operation in only one direction, conventional mechanical or electrical techniques can be included to prevent rotation in the opposite direction or to induce the correct mode by starting the rotor by other means such as a mechanical impulse.

In the illustrated embodiment, with 20 poles on the stator 11 and 20 magnets on the rotor 18, and with the resonator tuned to a frequency of 180 c.p.s., the rotor will turn at a speed of 9 r.p.s. In a clock or watch, the load L connected to the rotor will take the form of a conventional speed-reducing gear train to the hands. The gear train, battery and circuitry can to a large extent be mounted in the open spaces around the center of the motor and frequency reference assembly.

It should be noted that in the operation of the motor as described above, as well as in modifications which follow, a function of the rotor pickup is to run the motor up to synchronous speed or to recover synchronism following temporary power failure or other reduction of speed below that which is sufficient to retain the resonator in action. The motor will operate satisfactorily without a rotor pickup if other means, such as mechanical impulse spin up means, for example, are provided to bring the rotor to synchronous speed to start operation.

The system described above in conjunction with FIGS. 1–4 is typically a system characterized by the fact that current in the drive coil is predominantly limited by resistance of the drive coil and the supply voltage; that is, the limiting effects of induction and back e.m.f. are small compared to the limiting effect of resistance.

In motors developing a large back e.m.f. there are available in accordance with the invention other means of stabilizing drive torque with speed which result in the elimination of power lost in applying current at a time which results in deceleration.

A motor characterized by appreciable or high back e.m.f. in its drive coil exhibits a characteristic which is useful in stabilizing operations with a resonator or other frequency reference. When a voltage is applied to the winding of such a motor in rotation, the current which flows will vary with the phase of the back e.m.f. When back e.m.f. is negative (in the same direction as applied voltage) the current will be large. When back e.m.f. is positive and large, current will be small. Current in the region of maximum positive back e.m.f. will result in acceleration and in the region of negative back e.m.f. in deceleration. There is therefore a region in which current will result in accelerating torque proportional to current, and current will diminish as rotor angle moves toward 0° geometrical phase shift. This constitutes a region where a voltage pulse applied in leading phase relation to peak back e.m.f. will result in higher current and higher accelerating torque than a pulse applied in coincidence with peak back e.m.f.

Thus, there exists a condition which satisfies the basic requirement for stable operation with a fixed frequency or resonator source of timed voltage pulses. With fixed frequency voltage pulses set nominally to lead slightly the point of peak back e.m.f. the motor will run at a fixed speed. Any tendency to increase speed will result in less lead and less current, thus less torque and motor will slow down. Conversely, a tendency to run slow will increase lead of current and torque to accelerate the motor back to synchronous operation. In addition to the above, which will occur with absolutely fixed frequency input, a rotor driven resonator also corrects by having a lagging phase shift at slightly higher speeds and a leading phase shift at lower speeds.

In FIG. 4A, curves A-1 and B-1 show nominal settings of resonator and rotor pickup to accomplish the above. The geometrical phase angles for the rotor pickup and the resonator are approximately 45° and 135° respectively. The voltages in the pickups of both the resonator and the rotor are both approximately 135° electrical phase angle.

DESCRIPTION OF SECOND PREFERRED EMBODIMENT

Referring to FIGS. 5-7, there is illustrated a modification of the invention in which like elements and components are identified by like reference numerals. In this embodiment the pickup means 23a–d are shown with alternative means for isolation of the resonator pickup means from the magnetic influence of the rotor. The rotor 18 and stator 11 are of relatively smaller diameter than the resonator 20 so that the resonator pickup means 23 are disposed radially outwardly with respect to the rotor magnets 19 (as best seen in FIGS. 5 and 6). Thus, as the rotor turns, no signal, or at the most a negligibly small signal, is generated in the resonator pickup means due to rotor rotation. Separate pickup means 32 are provided for the rotor in the form of a pickup coil 32a and a U-shaped pole piece 32b having its ends disposed respectively adjacent the north and south poles of the rotor magnets 19 FIG. 6). The motor is arranged to operate in a magnetic attracting mode. The pickup means 32 is preferably carried by the stator and in any event is independent of any adjustment of resonator phase angle.

Referring to FIG. 5, the rotor 18 turns in a clockwise direction and the pickup means 32 and, more particularly, pole piece 32b thereof, is radially aligned with a pole piece 15a of the stator 11. Again, this position, with respect to the function of the motor, corresponds to zero geometrical phase angle, with the distance from one stator pole to the next being 360°.

The resonator 20 is coupled magnetically to the rotor to be excited into resonance by rotor rotation through the couplings between the rotor magnets 19 and a separate set of magnets 22a', –b', –c' and –d' on the upper sides of the respective resonator arms and spaced inwardly from the magnets 22a, b, c and d on the underside, the latter being used exclusively to generate control signals in the resonator pickup 23a, b, c and d. As in the arrangement of FIGS. 1–3, the magnets on adjacent arms of the resonator are oppositely polarized so that one pair of arms is repelled while the other is attracted when the rotor and resonator magnets are aligned, and the opposite occurs when the rotor magnets straddle the resonator magnets.

The drive and control circuits used in the modification of FIGS. 5–7 are shown diagrammatically connected to the exploded view of FIG. 7, and include a rotor pickup circuit indicated generally by the numeral 33 and a resonator pickup circuit indicated generally by the numeral 34. The rotor pickup circuit 33 includes a transistor 35 having the rotor pickup coil 32a connected in series across its base and emitter electrodes, and the resonator pickup circuit 34 includes a transistor 36 having the resonator pickup coils 23a–d connected in series across its base and emitter electrodes. The two transistors 35 and 36 are connected to function as switches in series with the stator coil 16 across the negative and positive terminals of the battery 26.

The operation of the circuit as thus far described is such that with the rotor in motion at a speed approximating synchronous speed and with the resonator in resonance, the transistors 35 and 36 are both rendered conducting at such times as positive voltage signals are generated in the respective pickup coils 32a and 23a–d. The circuit functions to reduce power consumption at conditions of resonance of the resonator and synchronism of the rotor therewith by eliminating rotor-retarding portions for each drive pulse, all as described below.

The circuit as thus far described, although significantly reducing power consumption, does not render the system self-starting and other means such, for example, as a mechanical impulse to the rotor to bring the rotor up to synchronous speed long enough to induce resonance of the resonator is required. Additional circuit means can, however, be provided, in accordance with the invention, in the form of a bias resistor 37 connected to the pickup coils 23a–d and a capacitor 38 connected to the emitter electrode of the transistor 36 and to the negative terminal of the DC power source to render the motor self-starting or, in marginal cases, capable of starting with a very small push which need not necessarily spin the rotor up to or beyond synchronous speed. In either case, it is preferred that the rotor pickup signal have a substantially greater magnitude than that used in the arrangement of FIGS. 1–3. The voltage is represented by the curve D-1 in FIG. 4.

Referring to FIGS. 8A–C, there is represented a series of curves illustrating the action of the motor: (1) when the rotor is turning substantially below resonance speed and using the self-starting circuitry 37–38 (FIG. 8A); (2) when the rotor is turning at synchronous speed but without additional geometrical phase adjustment for the resonator pickup (FIG. 8B); and (3) when geometrical phase adjustment is introduced for the resonator pickup and synchronous conditions obtain (FIG. 8C). In FIG. 8A, there is shown the sine wave voltage output 39 of the rotor pickup 32 and the square wave pulse 40 in the stator drive coil 16. The rotor, stator and transistor circuitry are functioning as a system in oscillation with a gain greater than unity. The trailing edge of the drive pulse and the point at which the rotor pickup sine wave crosses the zero voltage line correspond to the zero geometrical phase angle of the motor. Self-starting can occur because the transistor 35 is conducting due to the positive voltage from the rotor pickup 32 and the transistor 36 is conducting due to the action of the biasing circuit 37 and 38 even though the resonator is not excited. The entire control of the pulse in the drive coil 16 is in the transistor 35, which is in turn controlled by the rotor pickup means 32. Each time the signal in the rotor pickup means 32 goes positive the transistor 35 conducts and a pulse is started in the stator coil 16 which endures until the rotor pickup signal goes negative. This represents a long-duration accelerating pulse which serves to attract the rotor from standing conditions often preceded by mechanical oscillation of the rotor to a speed of continuous rotation at which the resonator is excited into resonance by the interaction of the rotor magnets 19 and the resonator magnets 22a'–d'.

In FIG. 8B, there is shown in addition to the rotor pickup sine wave voltage 39, the sine wave voltage 41 which is generated by the resonator pickup means 23 when resonance occurs. This sine wave is phase shifted 90° lagging with respect to the rotor pickup signal (assuming for purposes of explanation that the resonator pickups are in precise alignment with the stator poles, unlike FIG. 5). Maximum resonator-induced voltage occurs at zero geometrical phase angle of the motor because this is the point of maximum flexing velocity of the resonator arms due to alignment of the rotor magnets 19 and the resonator magnets 22a'–d'.

The operation of the resonator pickup circuit and its circuit 33 is such that the transistor 36, which in the absence of a resonator signal is biased "on," now cycles between on-off conditions and is rendered conducting only when the resonator pickup signal is positive. Thus, referring to FIG. 8B, the drive pulse 40 to the stator coil 16 is shortened from 180° of rotor rotation to 90° of rotor rotation and represents the maximum pulse, i.e., power, which can be fed into the motor at synchronism. While this system is operative and can be made to achieve minimum power waste, the sensitivity of control of power can be further improved in accordance with the invention.

Referring to FIGS. 5 and 8C, it will be observed that the resonator pickup means 23a–d is set in a lagging position, i.e., in the direction of rotor rotation, by an angle which represents approximately minus 80° in terms of geometric phase angle of the motor as well as electrical phase angle lag, the magnitude of which is represented by the numeral 42. Under these conditions, the resonator pickup signal will lag the rotor pickup signal by approximately 170° (the original 90° plus 80°) so that the driving pulse to the motor is reduced to approximately 10° of rotor phase angle. The brief duration of this pulse is set in the initial design of the motor so that it corresponds approximately to the design torque requirements of the system.

The motor should therefore operate at synchronous speed. If, however, the motor tends to accelerate for any reason, which can include, for example, increased voltage at the power source, shock or vibration of the motor or a decrease of its load, a compensating set of conditions will obtain. When the rotor speeds up, a further but small lag occurs in the phase of the resonator pickup voltage due to the dynamics of a system having a magnetic attraction mode motor and a rotor-excited resonator. A very small phase lag achieves a fast and appreciable change of the drive current in a direction to correct the disturbance from synchronism. The additional small lag shortens the driving pulse by a relatively large percentage, causing the motor to drop down to synchronous operation. If, however, the motor is slowed down below synchronism by factors such as decreasing voltage of the power source, load on the output, shock or vibration, the phase lag of the resonator pickup voltage will decrease slightly, thereby widening the pulse appreciably and quickly to apply additional power to the motor to drive it up to synchronism. In this fashion the motor achieves unusually strong synchronous characteristics and at the same time operates without the retarding pulse portions which are characteristic of conventional synchronous and pulse motors. Power consumption is therefore significantly decreased while at the same time the ability to maintain synchronism is significantly increased. Moreover, the motor can recover from complete loss of synchronism below synchronous speed down to zero and can also recover from transient acceleration to speeds significantly above synchronism.

If it is desired to decrease the magnitude of the accelerating pulse deriving from the rotor pickup (FIG. 8A), a bias can be put on the transistor 35 to delay the initiation of the square wave drive pulse to the stator, thereby shortening the point on the sine wave curve of the rotor pickup at which the square wave pulse begins. If this is done, however, it is necessary to effect a compensation in the cutoff time because the bias would normally cause the square wave pulse to terminate before the geometrical phase zero point. Compensation to shift the cutoff time back to the zero phase angle is accomplished by physically displacing the pickup means 32 circumferentially so that it is no longer in alignment with a stator pole 15a. Also, while all of the switching action of the circuitry associated with FIG. 7 has been shown as being based on positive pulses, it will be understood that the various switching actions can be made to occur on the negative side for both or either of the resonator and rotor pickups. It will also be understood that currents cannot be instantly turned on and cut off in inductive loads in electrical systems. Thus, compensating adjustment should be made in the physical positions and adjustments of the parts in the motor and its control systems.

As described above, the pulse width control of motor current, and thus motor driving torque is principally applicable to motors in which drive current is limited chiefly by drive coil resistance. This method is also applicable to motors showing appreciable or large back e.m.f. by arranging the geometrical phase angle of the rotor pickups and the resonator pickup and a bias on the rotor pickup so that the application of the voltage pulse to the drive coil is imitated, below resonance, by the rotor pickup set to turn on at approximately 180° and to turn on at the point on the back e.m.f. characteristic where the current would begin to increase as the back e.m.f. begins to drop from its positive peak. A setting for the turn off by rotor signal at 45° can be considered as typical. When resonant speed is achieved and resonator action begins, resonator signal timing to turn on the voltage pulse at somewhat less than 180° is considered typical. The above described action works to further enhance stability of synchronous operation against load, and supply voltage variations and external disturbances.

GENERAL DISCUSSION AND BRIEF SUMMARY

It is generally true that in order to control the speed of a motor at some required value it is necessary to control the net driving torque of the motor so that overspeed reduces torque and underspeed increases it. In a high Q resonator the phase of the electrical output of a resonator pickup is sensitive to very small changes of its exciting or driving frequency. In accordance with the invention as described above, the change of phase of the resonator pickup voltage as a function of speed is used in three basic methods to control the motor net driving torque in accordance with the above criterion to maintain the motor at a constant speed determined by the resonant frequency of the resonator coupled thereto. The methods are:

1. Net driving torque control by shifting the ratio of an accelerating torque to a decelerating torque by change of resonator phase shift. The motor of FIGS. 1-3 can be operated in this mode.

2. Driving torque control by changing the voltage amplitude of a drive torque pulse by shifting the timed location of drive current pulse toward and away from coincidence with motor back e.m.f. by resonator change of phase. The motor of FIGS. 1-3 can also be operated in this mode.

3. Driving torque control by changing the pulse duration of a drive current pulse by change of resonator phase. The motor of FIGS. 6-8 can be operated in this mode.

Operation in a repulsion mode; i.e., in a mode in which when drive current is flowing and the rotor is at or near 0° geometrical phase angle, the rotor either is repelled by the stator or the attraction between rotor and stator poles is diminished from the attraction normally occurring at no current, requires that control signals cited previously as advanced, be retarded. The degree of retarding control signals is such as to be substantially equivalent to a reversal of polarity of control signals plus an advance which is approximately the same as the advance used in an attracting mode. Repulsion mode operation is, therefore, equivalent to attraction mode operation with the reference for electrical phase angles transferred to 180° geometrical phase angle. By the words "phase advance," therefore, is meant either phase advance with respect to zero geometrical phase angle (as in the case of motors operating in the attraction mode) or with respect to 180° geometric phase angle (as in the case of motors operated in the repulsion mode).

A case of repulsion mode operation which differs slightly from the above exists when variable drive-pulse width stabilization is used where resonator signals turn on the drive pulse and rotor signals turn it off. When the repulsion drive current is somewhat lagging 0° geometrical phase angle and terminated before 180° geometrical phase angle, stability can be achieved by leading-edge pulse phase movement toward and away from zero. This method has the disadvantage that stability will be impaired if the leading edge crosses 0° phase angle upon slowing down of the motor as by loading or voltage drop.

While the invention has been described above having reference to three preferred embodiments thereof (each as applied to both high and low efficiency motors), it will be understood that within the broad concepts it can take other forms and arrangements. For example while phase angle curves A, A-1, B and B-1 show phase angles resulting from the location of rotor and resonator pickups at specific geometrical phase angles, it is possible to locate pickups physically at any arbitrary angle and by use of phase shifters to locate the electrical phase of their outputs at any desired location. Additionally, other kinds of pickup (optical, piezzo electric, Hall effect, etc.) can be used employing either specific geometric location or phase shifters to bring their outputs to desired electrical phase angle. The resonator 20 can be carried by the rotor 18 to turn therewith, in which case it can be excited into resonance by complementary magnetic means carried by the resonator arms and the base. In such case the resonator pickup is preferably made insensitive to rotational motion. Also the stator structure can be made with its poles facing in another direction, such as upward or downward, with the rotor and resonator correspondingly shaped and dimensioned. The magnets 19 and 22 can be either aligned axially as illustrated in FIG. 2 or slightly offset, and, if desired, the magnetic structure of the rotor can be made separate from the magnetic structure which generates the control signals reflecting rotor speed, although at some increase in size and complexity. In many cases permanent magnets can be replaced by slugs of ferromagnetic material, it being required only that a permanent or electromagnet be included somewhere in each magnetic circuit or loop. For example, in the applicant's copending application, Ser. No. 870,577 filed Oct. 29, 1969, a motor is shown in which the rotor includes no permanent magnets. Also, in accordance with that disclosure the function of the rotor pickup can be embodied in the motor winding itself, thereby eliminating the use of a discrete pickup means. As used in the claims, therefore, the word "magnetic" is intended to cover permanent as well as nonpermanent magnets. Also, the rotor can be made with a continuous rim and portions can be magnetized to form the poles.

Also, the cruciform plate resonator can be replaced by another resonator geometry, such as a balance wheel (either coaxial with the rotor or offset), or a tuning fork, the latter being turned on its side to present the side of at least one tine (vibrating vertically as viewed in the drawing) to the rotor and control coil, at some loss, however, of stability under environmental conditions and increase in total thickness of the assembly. Also, as indicated above while the pickups have been illustrated as taking the form of coils, other pickup techniques can be used, such as capacitors, solid state flux sensitive devices or the like. Further, the axis of the motor can be offset from the nodal mounting of the cruciform resonator so that only one or two arms of the resonator will be coerced by the rotor magnetic means to excite resonance. The invention should not, therefore, be regarded as limited except as defined in the following claims.

I claim:

1. A DC energized timing motor comprising a motor portion including a rotor, a stator and a common winding, said motor portion being responsive to torque pulses generated by current pulses to the winding in timed relation to rotor and stator position to drive the rotor, with change in the lag-lead characteristics of the torque pulses with respect to rotor-stator position effecting a change in rotor acceleration-deceleration characteristics, the invention comprising a resonator to furnish a frequency reference; a direct permanent magnetic coupling between the resonator and the rotor to excite the resonator to its resonant frequency when the rotor achieves synchronous speed; pickup means responsive to resonant action of the resonator to furnish output signals; a source of DC power; circuit means, including power amplifier means connected to the DC source, to the winding, and to the pickup means and responsive to the signal from the pickup means to supply current pulses to the winding to generate torque pulses; means to isolate the pickup means of the resonator from the rotor to preclude rotor-induced signals in the pickup means capable of operating the motor; and means to preset the angular position of the resonator and its pickup in phase advance relative to geometrical phase angle zero thereby to establish torque pulses which increase in magnitude with decrease in rotor speed and which decrease in magnitude with increase in rotor speed, thereby to stabilize the motor around synchronous speed.

2. Apparatus as set forth in claim 1, said motor and its winding exhibiting characteristics which limit the magnitude of the current pulses primarily by the winding resistance, said phase advance of the resonator being substantially less than 90° to generate a net torque differential between accelerating and retarding torque to match the motor load.

3. Apparatus as set forth in claim 1, said motor including a winding, stator and rotor exhibiting characteristics resulting in the drive current pulses being limited primarily by winding inductance and back electromotive force, said phase advance of the resonator being 90° plus an additional increment to advance the effective midpoint of the current pulses in the winding to occur prior to the point of maximum back electromotive force.

4. Appratus as set forth in claim 1, including timing control means to adjust the relative angular positions of the resonator and stator in a narrow range around the preset phase-advance point thereby to effect a timekeeping adjustment of the motor not involving motor stability.

5. A DC energized timing motor comprising a motor portion including a rotor, a stator and a common winding, said motor portion being responsive to torque pulses generated by current pulses to the winding in timed relation to rotor and stator position to drive the rotor, with change in the lag-lead characteristics of the torque pulses with respect to rotor-stator position effecting a change in rotor acceleration-deceleration characteristics; the invention comprising a resonator to furnish a frequency reference; a direct permanent magnetic coupling between the resonator and the rotor to excite the resonator to its resonant frequency when the rotor achieves synchronous speed; pickup means responsive to resonant action of the resonator to furnish output signals; a source of DC power; circuit means, including power amplifier means connected to the DC source, to the winding and to the pickup means and responsive to the signal from the pickup means to supply current pulses to the winding to generate torque pulses; means to isolate the pickup means of the resonator from the rotor to preclude rotor-induced signals in the pickup means capable of operating the motor; and rotor pickup means to generate signals reflecting the passage of successive rotor poles, said rotor pickup means being separated from said resonator pickup means to afford an independent output signal connected to said circuit means.

6. Apparatus as set forth in claim 1, including bias means in said circuit means to reduce the duration of the torque pulses.

7. Apparatus as set forth in claim 5, including bias means to control the duration of the torque pulses to less than 180° of geometrical phase angle.

8. Apparatus as set forth in claim 5, said circuit means including means responsive to the rotor pickup means to cut off rotor decelerating pulses to the motor winding, said motor thereby being energized by only rotor accelerating pulses, and means responsive to change in rotor phase angle relative to the resonator to change the duration of the accelerating pulses to maintain synchronism under varying load conditions and under varying supply voltage from the DC source.

9. Apparatus as set forth in claim 5, including circuit means to selectively utilize the rotor and resonator pickup signals, whereby the rotor pickup signals control the current and torque pulses between zero and slightly above synchronous rotor speeds, and the pickup signals from the resonator control the current and torque pulses at synchronous speed.

10. Apparatus as set forth in claim 5, including circuit means connected to said rotor and resonator pickup means, said circuit means, at synchronous speed, responding to the resonator pickup signals to initiate each of the current pulses and responding to the rotor pickup signals to turn off each of the current pulses, whereby change in duration, both increasing and decreasing, maintains synchronism.

11. Apparatus as set forth in claim 10, including circuit means responsive to the rotor pickup signals to energize the winding in the absence of resonator pickup signals.

12. Apparatus as set forth in claim 5, said motor and its winding exhibiting characteristics which limit the magnitude of the current pulses primarily by the winding resistance, said circuit means including a rotor pickup circuit and a resonator pickup circuit to control cooperatively the energization of the winding, said rotor pickup circuit including means to produce current and torque pulses terminating at a predetermined phase angle, said resonator pickup circuit including means to delay the initiation of the current and torque pulses when the resonator is at resonance, and amplifier means responsive to the signals to energize the motor winding with controlled torque pulses which decrease in duration when the rotor accelerates from synchronism and which increase when the rotor decelerates from synchronism.

13. Apparatus as set forth in claim 10, said rotor pickup circuit and said resonator pickup circuit each including switch means connected in series with each other and with the motor winding, said circuit means for the rotor pickup including means to close its switch when the rotor is not more than 180° in advance of geometrical phase angle zero, said circuit means for the resonator pickup including means to close its switch at no more than 90° in advance of geometrical phase angle zero when the resonator is operating at resonance and to open its switch before the rotor circuit switch closes for initiating the next successive pulse.

14. Apparatus as set forth in claim 13, including bias means in said resonator pickup circuit to close the switch in the absence of a signal from said resonator pickup means, whereby until resonance occurs in the resonator the motor is energized continuously under the control of signals from said rotor pickup means.

15. Apparatus as set forth in claim 5, said motor including a winding, stator and rotor exhibiting characteristics resulting in the drive current pulses being limited primarily by winding inductance and back electromotive force, said circuit means being responsive to both resonator pickup signals and rotor pickup signals to generate current and torque pulses having only rotor-accelerating characteristics and having a duration less than 180° of geometrical phase angle, and means to locate the pulses with their effective midpoints occurring substantially at the instant of peak back electromotive force in the motor, thereby to stabilize the motor at synchronous speed by effecting compensating changes in pulse width.

16. Apparatus as set forth in claim 5, said motor including a winding, stator and rotor exhibiting characteristics resulting in the drive current pulses being limited primarily by winding inductance and back electromotive force, said circuit means being responsive to both resonator pickup signals and rotor pickup signals to generate current and torque pulses having only rotor-accelerating characteristics and having a duration less than 180° of geometrical phase angle, and means to locate the pulses with their effective midpoints in phase advance with respect to the instant of peak back electromotive force in the motor, thereby to stabilize the motor at synchronous speed by effecting compensating changes in current pulse width and magnitude.

17. Apparatus as set forth in claim 10, including means to advance the phase angle of the resonator relative to the rotor and at the same time to retard the phase angle of the rotor relative to the resonator under increasing load or decreasing supply voltage or both, and means to retard the phase angle of the resonator relative to the rotor and at the same time to advance the phase angle of the rotor relative to the resonator under decreasing load or increasing supply voltage, or both, whereby the duration of each drive pulse to the winding is changed in the appropriate direction to increase or decrease the duration of the pulses to maintain the rotor in synchronism with the resonator.

18. A DC energized timing motor comprising a motor portion including a rotor, a stator and a common winding, said motor portion being responsive to torque pulses generated by current pulses applied to the winding in timed relation to rotor and stator position to drive the rotor, with change in the lag-lead characteristics of the torque pulses with respect to relative rotor-stator position effecting a change in rotor acceleration-deceleration characteristics; the invention comprising oscillator means to generate a train of control pulses of uniform frequency; pickup means responsive to rotor motion to furnish a train of control pulses each terminating no later than substantial alignment of rotor and stator poles a source of DC power; and circuit means, including power amplifier means having a pair of series connected switches respectively connected to the oscillator means and the pickup means to be activated by the control pulses therefrom, thereby to connect the DC source to the winding when both switches are closed said pickup means for the rotor being positioned to close its switch when the rotor is not more than substantially 180° in advance of alignment of rotor and stator poles, said oscillator means normally closing its switch while the pickup switch is closed and opening its switch between the time the pickup switch opens and then closes for initiating the next torque pulse, whereby change in rotor speed changes the phase relation between the torque-initiating signal from the oscillator means and the torque-terminating signal from the rotor pickup means to change the accelerating torque-pulse width, whereby the rotor is returned to synchronism.

19. Apparatus as set forth in claim 1, said resonator comprising a resonator having a central nodal point and at least four concomitantly vibrating arms, and being disposed with its nodal point arranged coaxially with the rotor and coplanar therewith.

20 Apparatus as set forth in claim 19, said resonator comprising a cruciform plate.

21. Apparatus as set forth in claim 19 including first magnetic means on the resonator to coact with the rotor to excite the resonator when the rotor is driven at a predetermined synchronous speed, and second magnetic means spaced from the first to excite the resonator pickup means.

* * * * *